United States Patent
Brenner et al.

(10) Patent No.: US 6,225,769 B1
(45) Date of Patent: May 1, 2001

(54) DEVICE FOR OPERATING AN ELECTRIC MOTOR

(76) Inventors: Veit-Michael Brenner, Zeisigweg 5, D-75428 Illingen (DE); Lukas Thull, Haldenweg 21, D-71696 Moeglingen (DE); Reinhold Weible, Helmulfstr. 8, D-70437 Stuttgart (DE)

( * ) Notice: Subject to any disclaimer, the term of this patent is extended or adjusted under 35 U.S.C. 154(b) by 0 days.

(21) Appl. No.: 09/002,343

(22) Filed: Jan. 2, 1998

Related U.S. Application Data

(63) Continuation of application No. 08/851,336, filed on May 5, 1997, now abandoned, which is a continuation-in-part of application No. 08/463,073, filed on Jun. 5, 1995, now abandoned.

(30) Foreign Application Priority Data

Jun. 7, 1994 (DE) ................................. 44 19 813

(51) Int. Cl.⁷ .................................................. H02K 17/32
(52) U.S. Cl. .......................... 318/434; 318/458; 318/469; 361/31
(58) Field of Search ............................. 318/434, 466–469, 318/452–458; 361/29, 31, 93, 100

(56) References Cited

U.S. PATENT DOCUMENTS

| | | | |
|---|---|---|---|
| 3,959,704 | 5/1976 | McCrea | 318/587 |
| 4,641,067 * | 2/1987 | Iizawa et al. | 318/287 |
| 5,151,638 * | 9/1992 | Beckerman | 318/434 |
| 5,170,108 | 12/1992 | Peterson et al. | 318/469 |
| 5,334,876 * | 8/1994 | Washeleski et al. | 307/10.1 |
| 5,399,950 | 3/1995 | Lue et al. | 318/365 |
| 5,543,692 * | 8/1996 | Howie et al. | 318/282 |
| 5,563,482 * | 10/1996 | Shaw et al. | 318/272 |
| 5,600,218 * | 2/1997 | Holling et al. | 318/439 |
| 5,614,798 * | 3/1997 | Zydek et al. | 318/434 |

FOREIGN PATENT DOCUMENTS

| | | |
|---|---|---|
| 2820330 | 11/1979 | (DE) . |
| 0137263 A2 | 4/1985 | (EP) . |
| 0116904 | 1/1989 | (EP) . |
| 0 462 050 A1 | 5/1991 | (EP) . |
| 2104322 | 3/1983 | (GB) . |
| 2152308 | 7/1985 | (GB) . |
| 2212679 | 7/1989 | (GB) . |
| 2246035 | 1/1992 | (GB) . |

* cited by examiner

Primary Examiner—Brian Sircus

(57) ABSTRACT

A device for operating an electric motor (10) is proposed, which evaluates overloading or blocking of the drive (11) from a characteristic of a current (40, 41) flowing through the electric motor (10). In accordance with a first embodiment, the determination of the characteristic is provided within a time interval (TI)' the time interval (T:) occurring within the starting operation after a starting instant (To) of the electric motor (10). In accordance with another embodiment, the determination of the characteristic is provided at a prescribed sampling instant (TA) which occurs at a prescribed delay time (Tv) after a starting instant (To).

20 Claims, 3 Drawing Sheets

DEVICE FOR OPERATING AN ELECTRIC MOTOR

REFERENCE TO RELATED APPLICATIONS

This application is a continuation of U.S. application Ser. No. 08/851,336, filed May 5, 1997, which is a continuation-in-part of U.S. application Ser. No. 08/463,073 filed on Jun. 5, 1995, both now abandoned.

This application claims the right of foreign priority with respect to German Patent Application No. P 44 19 813.2 filed on Jun. 7, 1994, the subject matter of which is incorporated herein by reference.

BACKGROUND OF THE INVENTION

The invention relates to a device for operating an electric motor of the type having means for detecting a current flowing through the electric motor, and having an evaluation arrangement which evaluates at least one characteristic of the current, compares it with a threshold value and outputs an overload signal in the event of overshooting of the threshold value. German Patent 28 20 330 discloses a circuit arrangement for an electric window lift drive which has an anti-jamming device. An evaluation arrangement detects a current flowing through an electric motor, and a temporal current change referred to time. The two characteristics determined for the current flowing through the electric motor are added and compared with a prescribed threshold value. After an overshoot of the threshold value, the electric motor is, for example, reversed, so that an object possibly jammed by a pane is released again. The evaluation arrangement contains a plurality of capacitors which implement low-pass filters with the aid of further components in each case. In addition to suppressing interference signals, the suppression of higher-frequency signal components in the determination of the characteristics also effects suppression of the detection of the starting operation, in the case of which a high motor current occurs which can be a multiple above the value of the steady-state motor current.

EP-A 0 116 904 discloses a drive device for a flap in air conditioning systems of motor vehicles. The flap is actuated by a stepping motor. It is ensured that the flap actuated by the stepping motor reliably reaches mechanical end stops due to the fact that, on the one hand, independently of the position of the flap which is to be prescribed the control device applies to the stepping motor at the beginning of an operating phase a maximum number of steps which suffices for one of the end stops of the flap to be reached. On the other hand, in the case of each further setting of the flap in each of the mechanical end stops, in addition to the steps required for this purpose the stepping motor has further steps applied to it in the direction of movement of the flap, in order reliably to reach the respective end stop of the flap owing to this number of extra steps, and to compensate for possible lost steps of the stepping motor.

It is the object of the invention to provide a device for operating an electric motor, which uses simple means to detect an overload or a blocked state of the electric motor, in particular a stepping motor.

SUMMARY AND ADVANTAGES OF THE INVENTION

The above object is achieved according to a first object of the present invention by a device for operating an electric motor having means for detecting a current flowing through the electric motor, and having an evaluation arrangement which evaluates at least one characteristic of the current, compares it with a threshold value and outputs an overload signal in the event of overshooting of the threshold value, and wherein the determination of the characteristic is provided within a time interval $(T_I)$ which starts at a first prescribed time $(T_1)$ after a starting instant $(T_O)$, the electric motor being started at the starting instant $(T_O)$ starting from the at least approximately de-energized state, and which ends at a second prescribed time $(T_2)$ before the steady-state motor current is reached.

The above object is further achieved according to a second aspect of the invention by a device for operating an electric motor, having means for detecting a current flowing through the electric motor, and having an evaluation arrangement which evaluates at least one characteristic of the current, compares it with a threshold value and outputs an overload signal in the event of overshooting of the threshold value, and wherein the determination of the characteristic is provided at a prescribed sampling instant $(T_A)$ which occurs after a prescribed delay time $(T_V)$ after a starting instant $(T_O)$ at which the electric motor is started starting from the at least approximately de-energized state and which occurs before the steady-state motor current is reached.

The device according to the invention has the advantage that an overload state, for example a blocked state, can be detected by determining at least one characteristic of the current flowing through a motor, in particular a stepping motor.

It is provided in accordance with a first embodiment that the determination of the at least one characteristic is provided within an interval which, starting from the at least approximately de-energized state, begins at a prescribed time after starting the electric motor and ends before the steady-state motor current is reached. It is possible with the aid of this measure to detect an overload state or blocked state as early as the starting phase of the electric motor. The device according to the invention is therefore particularly suitable in the case of stepping motors to which individual starting pulses are applied to prescribe the number of steps, the flow of current through the motor starting at least approximately from the de-energized state in each case. A comparable operating state can occur in the case of a DC motor which has a clocked operation. It is provided within the framework of such a clocked operation that a prescribed operating voltage is connected to the DC motor for a prescribed interpulse period and is subsequently switched off again for a prescribed interpulse period. Both the ratio of pulse duration to interpulse period, and the frequency can be variable. A precondition for the proper functioning of the device according to the invention in the case of clocked operation of the DC motor is that the current flowing through the DC motor decreases within the interpulse periods at least approximately to the value zero.

In accordance with another embodiment of the device according to the invention, it is provided that the determination of the at least one characteristic is provided at a prescribed instant which occurs after starting the electric motor, starting from at least approximately de-energized state, and before the steady-state motor current is reached.

In accordance with still another embodiment of the device according to the invention, the determination of the at least one characteristic of the current is provided at that instant of time within the pulse duration at which the current flowing through the electric motor reaches a maximum, and an overload signal is emitted if the instant of time falls into a predetermined time interval or duration.

The devices according to the invention are particularly suitable for detecting mechanical end stops which can be reached by an actuator driven by an electric motor.

Advantageous developments and refinements of the devices according to the basic embodiments of the invention likewise are disclosed.

The amplitude of the current occurring in the interval or the amplitude occurring at the specific instant, for example, is provided as a first characteristic of the current to be evaluated. Another advantageous refinement provides that the current change or the maximum current difference which has occurred in the prescribed interval is determined as the characteristic. A development of this measure provides that the current change is referred to time. The relationship with time corresponds to a time derivative of the current which can be performed both within the interval (difference quotient) and at the prescribed specific instant (differential quotient).

Another advantageous refinement of the first embodiment provides that the interval starts simultaneously with the starting of the electric motor. This measure ensures that the characteristic can be detected without a gap at the same time as the starting of the electric motor.

An advantageous development provides that the characteristic detected is compared with a prescribed threshold value which can be designed to be adjustable, for example, and that in the event of the threshold value being exceeded, an overload state or a blocked state is detected and signaled. The blocked state can be used, for example, to detect the mechanical end stops, already described, of a drive actuated by the electric motor.

DETAILED DESCRIPTION OF THE PREFERRED EMBODIMENTS

Figure 1:
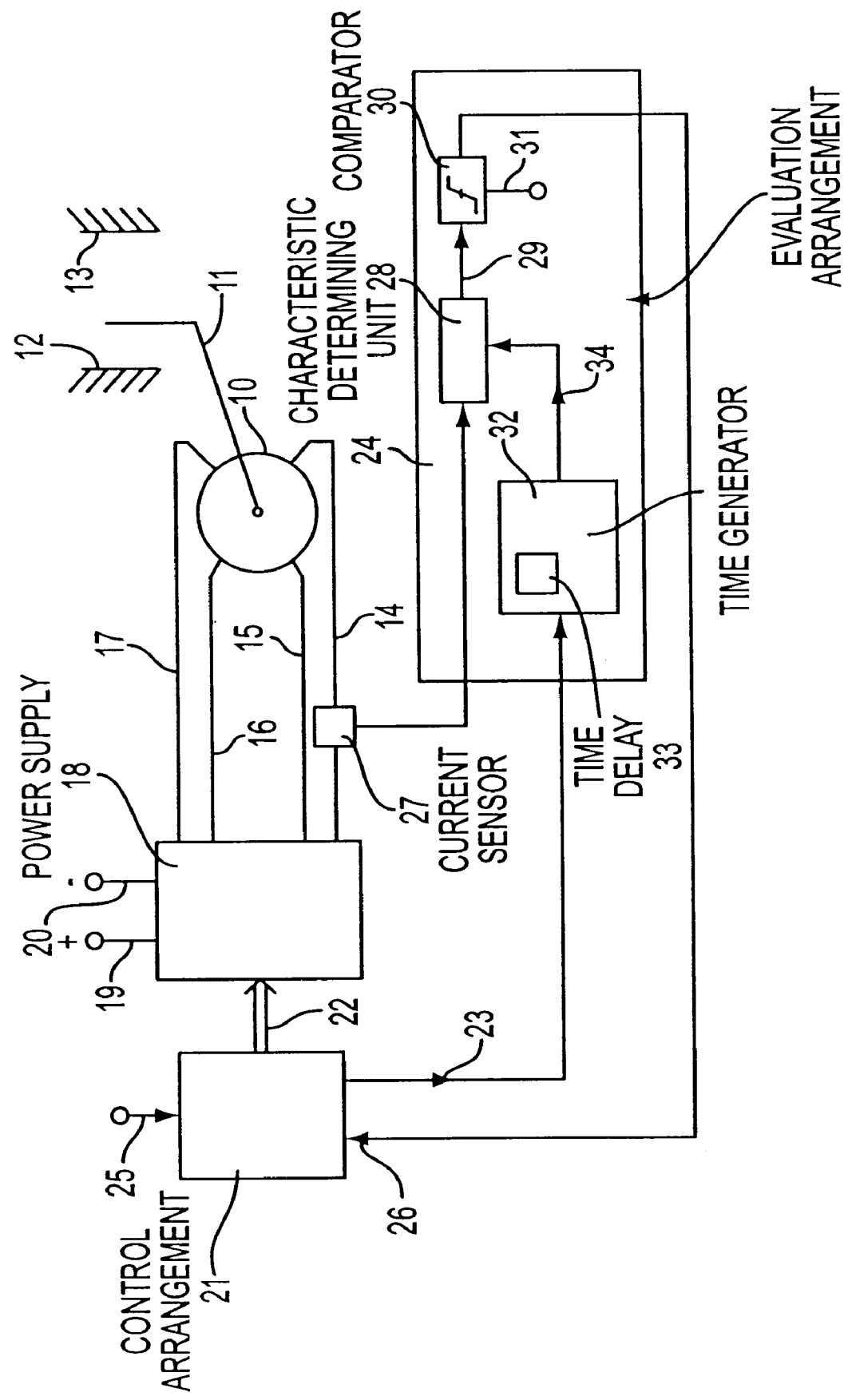
FIG. 1 shows a block diagram of a device according to the invention for operating an electric motor.

FIG. 1 shows an electric motor 10 which actuates a drive 11. The drive 11 has mechanical end stops 12, 13. The electric motor 10 is connected via four power supply lines 14–17 to a power output stage 18. The power output stage 18 is fed electric energy via power supply lines 19, 20.

A control arrangement 21 outputs control signals 22 to the power output stage 18 and a starting signal 23 to an evaluation arrangement 24. The control arrangement 21 is fed an external control signal 25 as well as an overload signal 26 generated by the evaluation arrangement 24.

Arranged in one of the power supply lines 14–17 is a current sensor 27 which detects the current flowing in the power supply line 14–17 and relays it to a characteristic-determining unit 28 which is contained in the evaluation arrangement 24. The characteristic-determining unit 28 outputs a characteristic signal 29 to a comparator 30 which compares the characteristic signal 29 with a prescribed threshold value 31, and outputs the overload signal 26 as a function of the result of comparison. The starting signal 23 is fed to a time generator 32 contained in the evaluation arrangement 24 and containing a time delay 33. The time generator 32 outputs an activation signal 34 to the characteristic-determining 10 unit 28.

Figure 2:
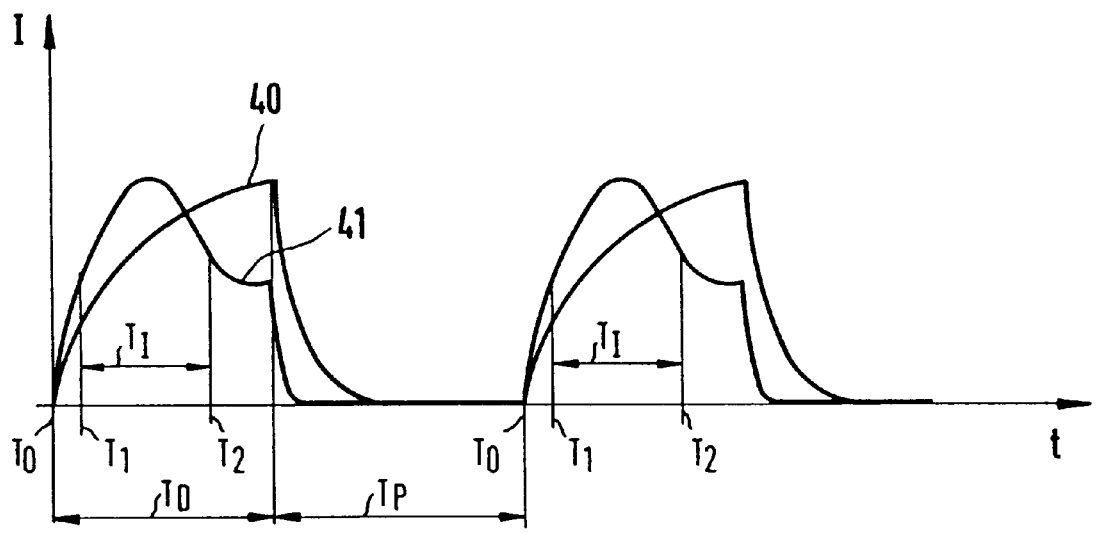
FIGS. 2, 3 and 4 respectively show current characteristics as a function of time which occur, according to different rejective modifications, in the device according to the invention in accordance with FIG. 1.

FIG. 2 shows as a function of time t the currents I which can be detected by the current sensor 27. A first current 40, which has a saw toothed characteristic, occurs in the non-overloaded operation of the drive 11. A second current 41 occurs when the drive 11 is overloaded. The currents 40, 41 respectively start to flow after a starting instant $T_O$. After the expiry of a prescribed pulse duration $T_D$ the currents 40, 41 drop to zero again. The current characteristic is repeated after a prescribed interpulse period $T_P$. A prescribed time interval T: starts at a first time $T_1$ and ends at a second time $T_2$.

Figure 3:
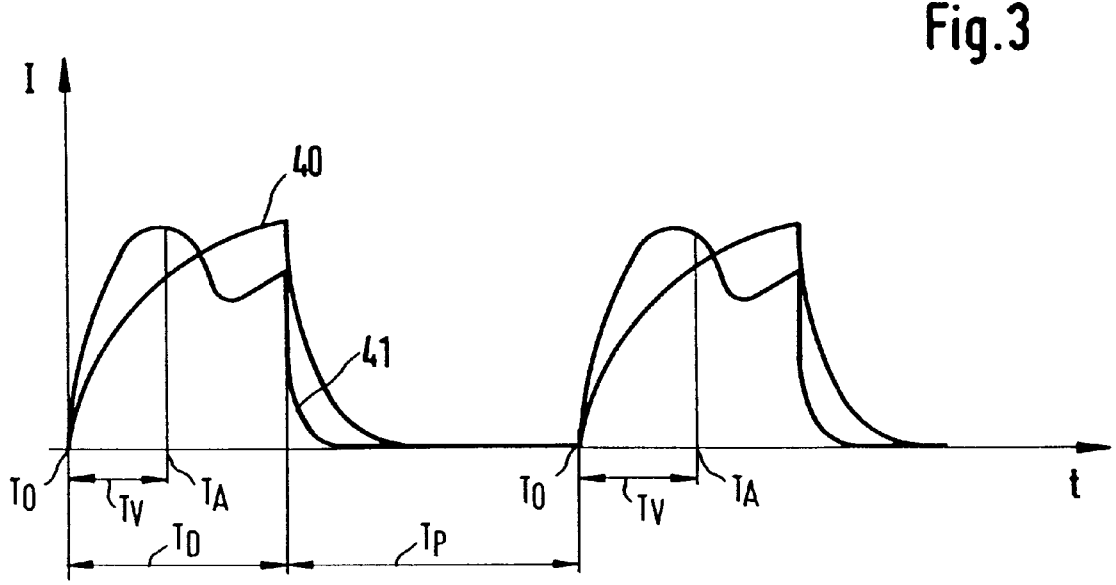

FIG. 3 shows the same currents 40, 41 as a function of time as does FIG. 2. Instead of the time interval $T_I$ shown in FIG. 2, in FIG. 3 a delay time $T_V$ occurs which starts from the starting instant $T_O$ and lasts until a sampling instant $T_A$.

The device according to the invention and in accordance with FIG. 1 operates as follows:

The electric motor 10 actuates the drive 11, which has the two end stops 12, 13. A DC motor excited by a permanent magnet or, preferably, a stepping motor, for example, is suitable as the electric motor 10. A bipolar stepping motor requires, for example as drawn in FIG. 1, at least four power supply lines 14–17. The power required by the electric motor 10 is provided by the power output stage 18, which draws it from an energy source (not shown in more detail) via the power supply lines 19, 20. The direction of rotation and, as the case may be, the motor output are fixed by the control arrangement 21 as a function of the external control signal 25, which arrangement communicates them to the power output stage 18 via the control signals 22.

The current 40, 41 flowing through the electric motor 10 is detected by the current sensor 27. In the case of a stepping motor having more than two power supply lines 14–17, it suffices when the current 40, 41 is detected in a selected power supply line 14.

A shunt resistor or the detection of a voltage drop across an output stage component, for example, is suitable as current sensor 27. The current is preferably detected via its accompanying magnetic field. Suitable elements are, for example, Mall sensors, magnetoresistive elements or, for example, inductive clamp meters.

The current detected by the current sensor 27 is relayed to the evaluation arrangement 24 which detects at least one specific characteristic of the current 40, 41 in the characteristic-determining unit 28. The characteristic signal 29 resulting therefrom is compared in the comparator 30 with the prescribed threshold value 31. The comparator 30 outputs the overload signal 26 to the control arrangement 21 as a function of the result of comparison.

The overload signal 26 signals that an overload state has occurred in the drive 11. Such an overload state occurs, for example, due to blocking of the electric motor 10 or of the drive 11. The blocking takes place, in particular, when one of the end stops 12, 13 is 30 reached. The overload signal 26 thus signals that one of the end stops 12, 13 is reached.

In the case of an electric motor 10 embodied as a stepping motor, the control arrangement 21 can itself determine the required number of steps by purposely driving up to the two end stops 12, 13, and in this way carry out a calibration. The aim of the calibration is to assign to a prescribed position of the drive 11 between the stops 12, 13 a specific number of steps which are to be provided. Using this measure it is possible to carry out a calibration not only during commissioning, but also later during operation at any time. As a result, it is possible at any time to take account of and compensate for scatter in mass production of the drive 11, age induced changes, changes in elasticity as a function of temperature, and time-dependent mechanical play. The device according to the invention is thus particularly suitable for operating the electric motor 10 for use in a motor vehicle which is exposed to extremely rough environmental conditions. A flap drive ir an air conditioning system of the motor vehicle, for example, is provided as the drive 11.

According to the invention, a time-dependent determination of the characteristic is provided. The time control is taken over by the time generator 32, which contains the time delay 33. The time cycles will be explained in more detail with the aid of the current characteristics I, shown in FIGS. 2 and 3, as a function of time t.

In accordance with a first embodiment of the device according to the invention, the determination of the characteristic is provided within the time interval $T_1$ shown in FIG. 2, which starts at the first prescribed time $T_1$ after the starting of the electric motor 10 at the starting instant $T_O$ and ends at the second prescribed time $T_2$. It is essential that at the starting instant $T_O$ the electric motor 10 is at least approximately in the de-energized state, and that the interval $T_1$ ends at the second time $T_2$ before the steady 30 state motor current has been reached. These measures ensure that only the starting phase is used to determine the characteristic. This starting phase can be substantially shorter than the pulse duration $T_D$.

An overload state is expressed in different characteristics of the currents 40, 41. While the non-overloaded case corresponds to the current 40, the overload case is present in the case of the current 41. As an example, the current amplitude occurring in the interval $T_I$ can be determined as a suitable characteristic and output as characteristic signal 29. A further, suitable characteristic is the current change which has occurred within the interval $T_I$. The determination of the current change is performed by dividing the time interval $T_I$ into a prescribed number of sub intervals in which the current differences between the start of a subinterval and end of a subinterval are respectively determined and subsequently summed.

Another characteristic is provided by the current change within the entire interval $T_I$ referred to the interval time $T_I$. Instead of a difference quotient, it is possible, furthermore, to determine the rise in the current 40, 41 at least approximately as a differential quotient. It is possible, for example, to select the maximum value from the plurality of differential quotients determined within the time interval $T_I$ and to output it as characteristic signal 29. Another characteristic is the temporal mean value of the current 40, 41 in the time interval $T_I$.

In trials conducted using an electric motor 10 configured as a stepping motor, it emerged that a quicker current rise occurs in the case of overloading. Consequently, higher current values occur at an earlier instant after the starting instant $T_O$ in the case of overloading than without overloading. The interval $T_I$ can be matched experimentally to these circumstances. The electric motor 10 is supplied with power within the pulse duration $T_D$ and subsequently stopped. After the pulse duration $T_D$ the current 40, 41 decreases again to the value zero within the interpulse period $T_P$. Care is to be taken that the interpulse period $T_P$ is dimensioned to be so long that the current 40, 41 can decrease to zero at least approximately. Clocked operation of a DC motor, in the case of which no current gaps occur between the individual pulse durations $T_D$, reduces the reliability of detection of the overload state.

The first time $T_1$, which corresponds to the start of the time interval $T_I$, can coincide with the starting instant $T_O$.

FIG. 3 shows another embodiment of the device according to the invention for operating the electric motor 10 in which, instead of the time interval $T_I$ shown in FIG. 2, sampling of the current 40, 41 is provided at a prescribed sampling instant $T_A$. The sampling instant $T_A$ is at a distance from the starting instant $T_O$ by the prescribed delay time $T_V$, which is prescribed by the time delay 33 in the time generator 32. This embodiment is particularly suitable when the instantaneous value or the amplitude of the current 40, 41 or the differential quotient at the sampling instant $T_A$ is to be determined as the characteristic.

The first and second times $T_1$, $T_2$ shown in FIGS. 2 and 3 and which fix the time interval $T_I$, as well as the delay time $T_V$ and the sampling instant $T_A$ are respectively determined by the time generator 32 contained in the evaluation arrangement 24, and fed to the characteristic-determining unit 28 as activation signal 34. The starting point in each case is the starting signal 23, which corresponds to the starting instant $T_O$. The time delay 33 contained in the time generator 32 prescribes either the time between the starting instant $T_O$ and the first time $T_1$, or the delay time between the starting instant $T_O$ and the sampling instant $T_A$.

Figure 4:
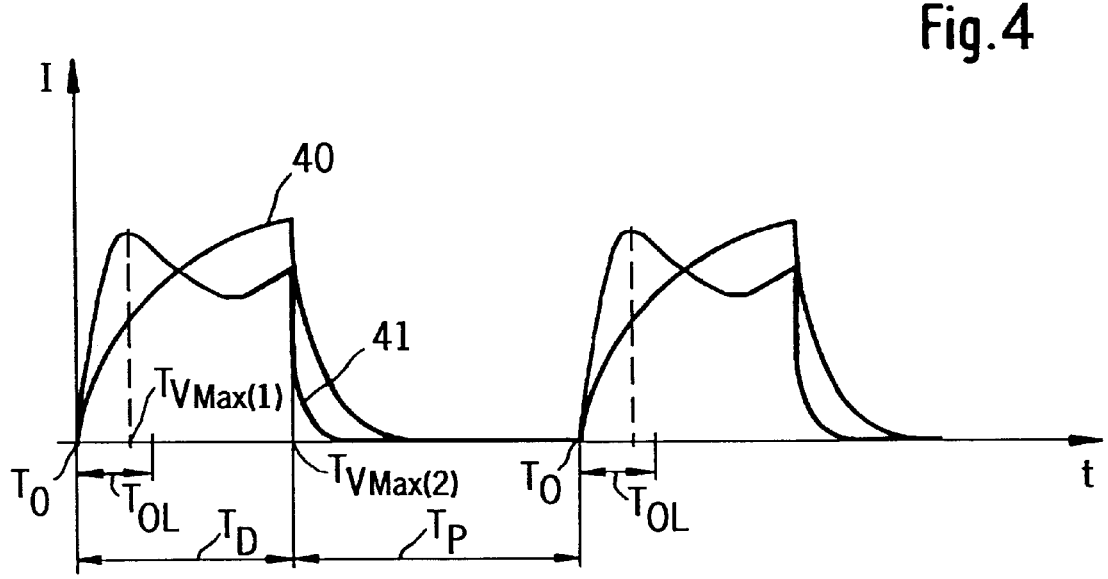

Turning now to FIG. 4, there is shown a further modification of the device according to the invention for operating the electric motor 10. According to this modification, a characteristic of the current is evaluated for determining the time $T_{V\,Max}$ at which the current 40, 41 flowing through the electric motor 10 has reached a maximum value within the pulse duration $T_D$. Since the current rises faster in the overload case of the current 41, the first maximum of the current within the pulse duration $T_D$ is also reached faster in the overload state than in the non-overloaded state. While, during normal operation, the current 40 reaches a first maximum at the time $T_{V\,Max}(2)$, which coincides with the end of the pulse duration $T_D$, the current 41 in the overload case has a first maximum at the time $T_{V\,Max}(1)$, that is, at an earlier instant. The time $T_{V\,Max}$ may relate, for example, to the starting instant $T_O$ of the starting pulse. The characteristic-determining unit 28 emits a characteristic signal corresponding to the time $T_{V\,Max}$ to the comparator 30. Here, the comparator 30 is operated as a window comparator. If the point in time or instant of $T_{V\,Max}$ falls into a predetermined interval or window $T_{OL}$, the comparator 30 emits the overload signal 26 and the overload case prevails. If, however, the time of $T_{V\,Max}$ is outside of the time interval $T_{OL}$, an overload signal 26 is not emitted by the comparator 30.

The interval $T_{OL}$ is a function of the type of the electric motor 10 and can be determined, for example, experimentally. For the electric motors normally used in clocked operation, an overload state or case can be assumed when the interval $T_{OL}$ begins with the starting instant $T_O$ and has a width which is 0.3 times that of the pulse duration $T_D$. In the overload case, the first maximum of the current occurs within this interval after the starting instant $T_O$, whereas, during normal operation without overload, the first maximum is reached essentially simultaneously with the end of the pulse duration $T_D$, that is, outside of the interval $T_{OL}-[T_O\,\ldots\,T_O+0.3\,T_D]$.

For determining the time $T_{V\,Max}$, the evaluation of the time difference quotient of the current or time differential quotient of the current 40, 41 is particularly suitable. When the current maximum value is reached, the differential quotient assumes the value 0 and the difference quotient a value close to 0, with both of these quantities passing through zero. The characteristic-determining unit 28 can thus determine the time $T_{V\,Max}$ by detecting the time from the starting instant $T_O$ to the zero passage of the difference quotient of the current or of the differential quotient of the current. Alternatively and/or additionally, the second or multiple time derivative can also be evaluated.

The invention now being full described, it will be apparent to one of the ordinary skill in the art that any changes and modifications can be made thereto without departing from the spirit or scope of the invention as set forth herein.

What is claimed:

1. A device for operating an electric motor which is one of a stepping motor and a clocked DC motor, said device comprising:

means for supplying an operating current to said motor, with said motor current rising from a starting instant ($T_O$) and then dropping to approximately zero after the expiration of a prescribed pulse duration ($T_D$) to cause said motor to start at the starting instant ($T_O$) from an at least approximately de-energized state and then to be switched off after the prescribed pulse duration ($T_D$), and with the motor current then reaching a subsequent starting instant ($T_O$) after the expiration of a further prescribed interpulse period ($T_P$), at which subsequent starting instant the motor current again begins to rise and to again switch on said motor;

means for detecting a current flowing through the electric motor; and, an evaluation arrangement including means for evaluating at least one characteristic of the measured current, and means for comparing the at least one characteristic with a threshold value and for providing an overload signal in the event of overshooting of the threshold value, with the overload signal being supplied to said means for supplying operating current to cause a change in the supplied operating current; and wherein said means for evaluating determines the at least one characteristic within a time interval ($T_I$) which starts at a first prescribed time ($T_1$) after the starting instant ($T_O$), and which ends at a second prescribed time ($T_2$) before a steady-state motor current is reached, and with the sum of the time interval ($T_I$) and the first prescribed time ($T_1$) being shorter than the prescribed pulse duration ($T_D$).

2. The device as claimed in claim 1, wherein the first prescribed time ($T_1$) coincides with the starting instant ($T_O$).

3. The device as claimed in claim 1, wherein the overload signal is a blocking signal if blocking of a drive actuated by the electric motor occurs.

4. The device as claimed in claim 3, wherein a blocking signal is generated when an end stop of the drive is reached.

5. The device as claimed in claim 1, wherein the electric motor is a stepping motor whose step frequency corresponds to the pulse duration ($T_D$) and the interpulse period ($T_P$).

6. The device as claimed in claim 1, wherein the electric motor is a clocked DC motor whose clock frequency corresponds to the pulse duration ($T_D$) and the interpulse period ($T_P$).

7. The device as claimed in claim 1, wherein the evaluated characteristic does not additionally take the current itself into account.

8. A device for operating an electric motor which is one of a stepping motor and a clocked DC motor, said device comprising:

means for supplying an operating current to said motor, with said motor current rising from a starting instant ($T_O$) and then dropping to approximately zero after the expiration of a prescribed pulse duration ($T_D$) to cause said motor to start at the starting instant ($T_O$) from an at least approximately de-energized state and then to be switched off after the prescribed pulse duration ($T_D$), and with the motor current then reaching a subsequent starting instant ($T_O$) after the expiration of a further prescribed interpulse period ($T_P$), at which subsequent starting instant the motor current again begins to rise and to again switch on said motor;

means for detecting a current flowing through the electric motor; and, an evaluation arrangement including means for evaluating at least one characteristic of the measured current, and means for comparing the at least one characteristic with a threshold value and for providing an overload signal in the event of overshooting of the threshold value, with the overload signal being supplied to said means for supplying operating current to cause a change in the supplied operating current; and wherein said means for evaluating determines the at least one characteristic at a prescribed sampling instant ($T_A$) which occurs after a prescribed delay time ($T_V$) after the starting instant ($T_O$).

9. The device as claimed in claim 8, wherein the device is used in an air conditioning system of a motor vehicle, and wherein the electric motor actuates a flap which in operation reaches at least one end stop.

10. The device as claimed in claim 8, wherein the overload signal is a blocking signal if blocking of a drive actuated by the electric motor occurs.

11. The device as claimed in claim 8, wherein the electric motor is a stepping motor whose step frequency corresponds to the pulse duration ($T_D$) and the interpulse period ($T_P$).

12. The device as claimed in claim 8, wherein the device is used in an air conditioning system of a motor vehicle, and wherein the electric motor actuates a flap which in operation reaches at least one end stop.

13. The device as claimed in claim 8, wherein the electric motor is a clocked DC motor whose clock frequency corresponds to the pulse duration ($T_D$) and the interpulse period ($T_P$).

14. The device as claimed in claim 8, wherein the evaluated characteristic does not additionally take the current itself into account.

15. A device for operating an electric motor which is one of a stepping motor and a clocked DC motor, said device comprising:

means for supplying an operating current to said motor, with said motor current rising from a starting instant ($T_O$) and then dropping to approximately zero after the expiration of a prescribed pulse duration ($T_D$) to cause said motor to start at the starting instant ($T_O$) from an at least approximately de-energized state and then to be switched off after the prescribed pulse duration ($T_D$), and with the motor current then reaching a subsequent starting instant ($T_O$) after the expiration of a further prescribed interpulse period ($T_P$), at which subsequent starting instant the motor current again begins to rise and to again switch on said motor;

means for detecting a current flowing through the electric motor; and, an evaluation arrangement including means for evaluating at least one characteristic of the measured current to determine an instant of time $T_{V\,Max}$ within the pulse duration $T_D$ at which the current flowing through the electric motor reaches a maximum value, and means for comparing the instant of time $T_{V\,Max}$ with a predetermined time interval $T_{OL}$ within the pulse duration $T_D$, and for providing an overload signal if the instant $T_{V\ Max}$ falls within the predetermined time interval $T_{OL}$, with the overload signal being supplied to said means for supplying operating current to cause a change in the supplied operating current.

16. The device as claimed in claim 15, wherein the evaluated characteristic is derived from at least one of the temporal differential quotient of the current and the temporal difference quotient of the current.

17. The device as claimed in claim 16, wherein the interval $T_{OL}$ starts at the time $T_O$ at which the pulse duration $T_D$ starts.

18. The device as claimed in claim 17, wherein the interval $T_{OL}$ has a duration which is 0.3 times that of the pulse duration $T_D$, and wherein $T_{V\ Max}$ corresponds to the first current maximum after the start of $T_D$.

19. The device as claimed in claim 15, wherein the interval $T_{OL}$ starts at the time $T_O$ at which the pulse duration $T_D$ starts.

20. The device as claimed in claim 19, wherein the interval $T_{OL}$ has a duration which is 0.3 times that of the pulse duration $T_D$, and wherein $T_{V\ Max}$ corresponds to the first current maximum after the start of $T_D$.

* * * * *